United States Patent [19]

Berneuil et al.

[11] Patent Number: 5,611,489
[45] Date of Patent: Mar. 18, 1997

[54] ACTUATING SYSTEM FOR A VARIABLE AREA EXHAUST NOZZLE

[75] Inventors: Yves R. J. Berneuil, Paris; Christian W. B. Bettremieux, Le Mee sur Seine; Daniel G. A. Kettler, Chartrettes; Michel M. A. A. Lechevalier, Mormant; Xavier J. Pasquali, Le Mee sur Seine; Jean-Marie N. Pincemin, Crosne, all of France

[73] Assignee: Societe Nationale d'Etude et de Construction de Moteurs d'Aviation S.N.E.C.M.A., Paris Cedex, France

[21] Appl. No.: 62,757

[22] Filed: May 18, 1993

[30] Foreign Application Priority Data

May 20, 1992 [FR] France ................................ 92 06102

[51] Int. Cl.$^6$ ........................................................ F02K 1/12
[52] U.S. Cl. .................. 239/265.41; 92/65; 239/265.19
[58] Field of Search ......................... 239/265.19, 265.25, 239/265.33, 265.37, 265.39, 265.41; 244/78; 92/65; 60/230, 242, 271

[56] References Cited

U.S. PATENT DOCUMENTS

| 3,282,049 | 11/1966 | Benton ...................................... 92/65 X |
| 3,537,647 | 11/1970 | Camboulives et al. . |
| 3,814,325 | 6/1974 | McCardle, Jr. et al. ........... 239/265.39 |
| 4,043,509 | 8/1977 | McHugh et al. ................... 239/265.41 |
| 4,205,594 | 6/1980 | Burke ........................................... 92/65 |

FOREIGN PATENT DOCUMENTS

| 2602274 | 2/1988 | France .............................. 239/265.39 |
| 46108 | 4/1981 | Japan ......................................... 92/65 |
| 359979 | 3/1962 | Switzerland ............................... 92/65 |
| 936044 | 9/1963 | United Kingdom ............. 239/265.41 |
| 1254175 | 11/1971 | United Kingdom . |

*Primary Examiner*—Lesley D. Morris
*Attorney, Agent, or Firm*—Bacon & Thomas

[57] ABSTRACT

An actuating system for a variable area exhaust nozzle is disclosed having inner and outer flaps pivotally connected to an airframe whose positions may be varied by a single set of control cylinders. The control cylinders have a case in which is slidably mounted a pair of pistons, each having piston rods extending from one side, which piston rods extend through one end of the cylinder case. The piston rods may be arranged coaxially to minimize the bulk of the actuating cylinder. One of the piston rods is connected to the inner flaps, while the other of the piston rods is connected to the outer flaps. By selectively supplying pressurized fluid to one or more combinations of a first fluid chamber defined between one of the pistons and an end of the case, a second fluid chamber defined between the two pistons, and a third fluid chamber defined between the other of the pistons and the other end of the case the two piston rods can be made to extend or retract so as to move the inner and outer flaps to desired positions.

10 Claims, 5 Drawing Sheets

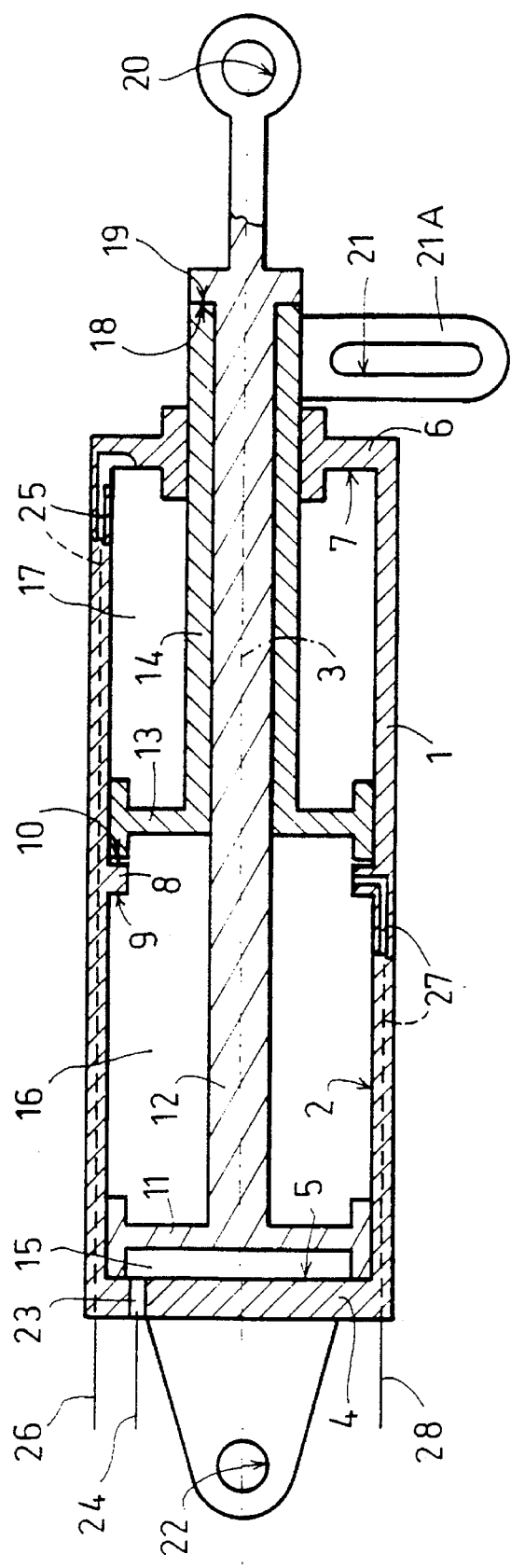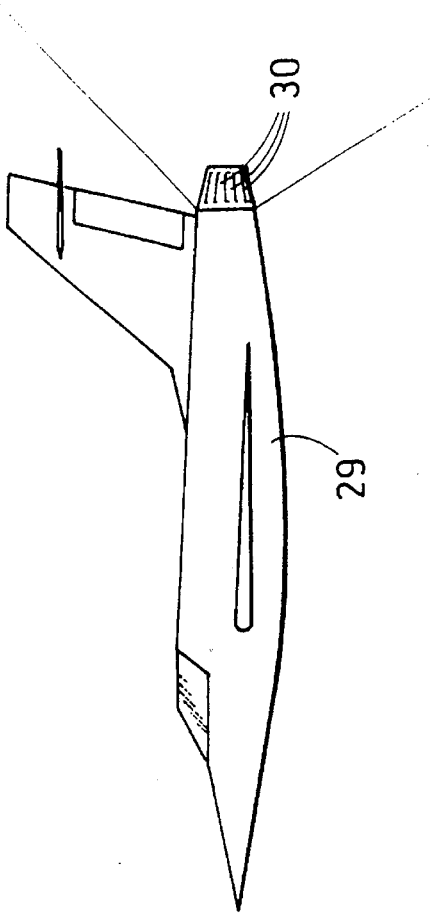
Fig_1
Fig_2

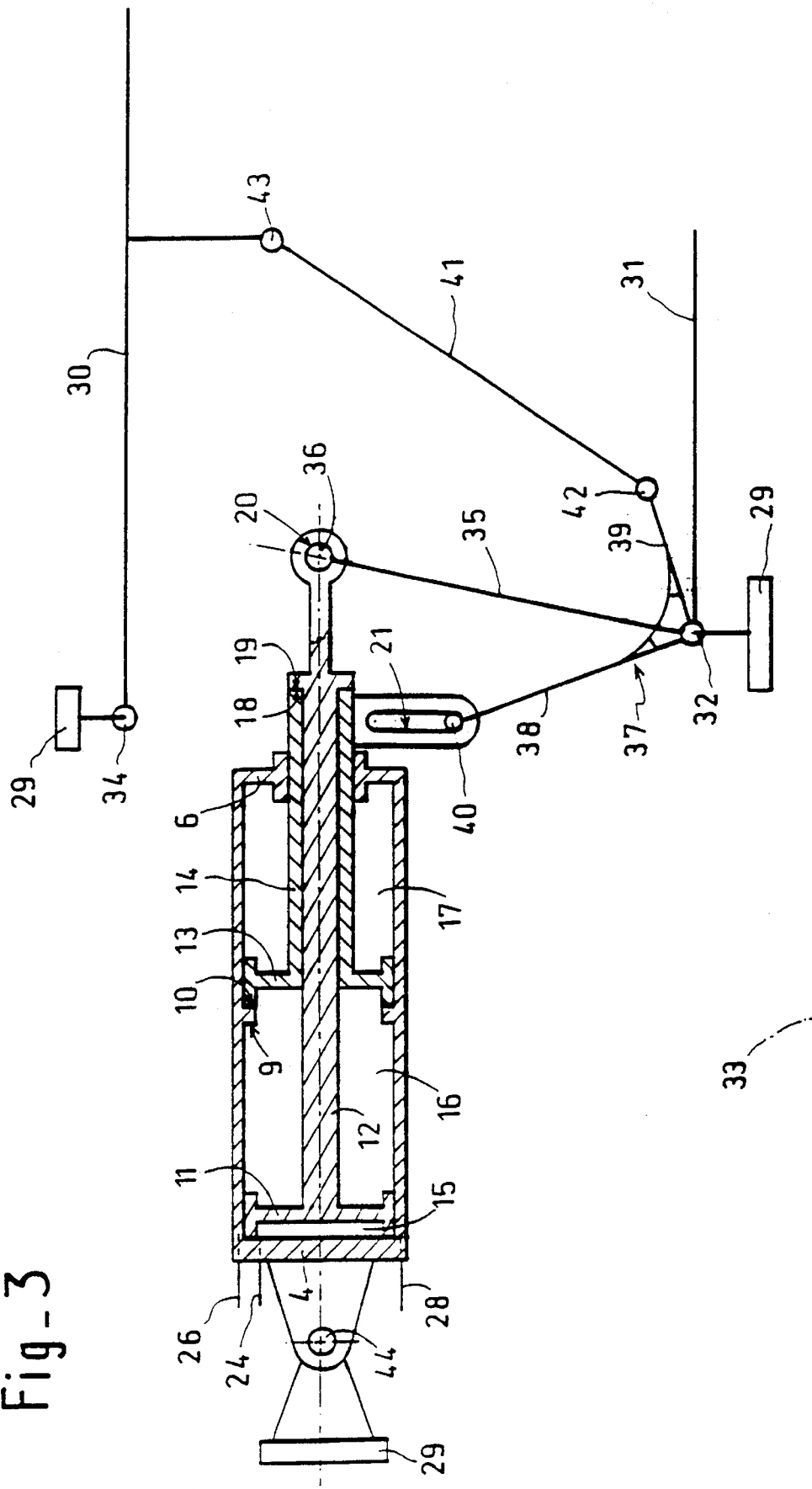
Fig._3

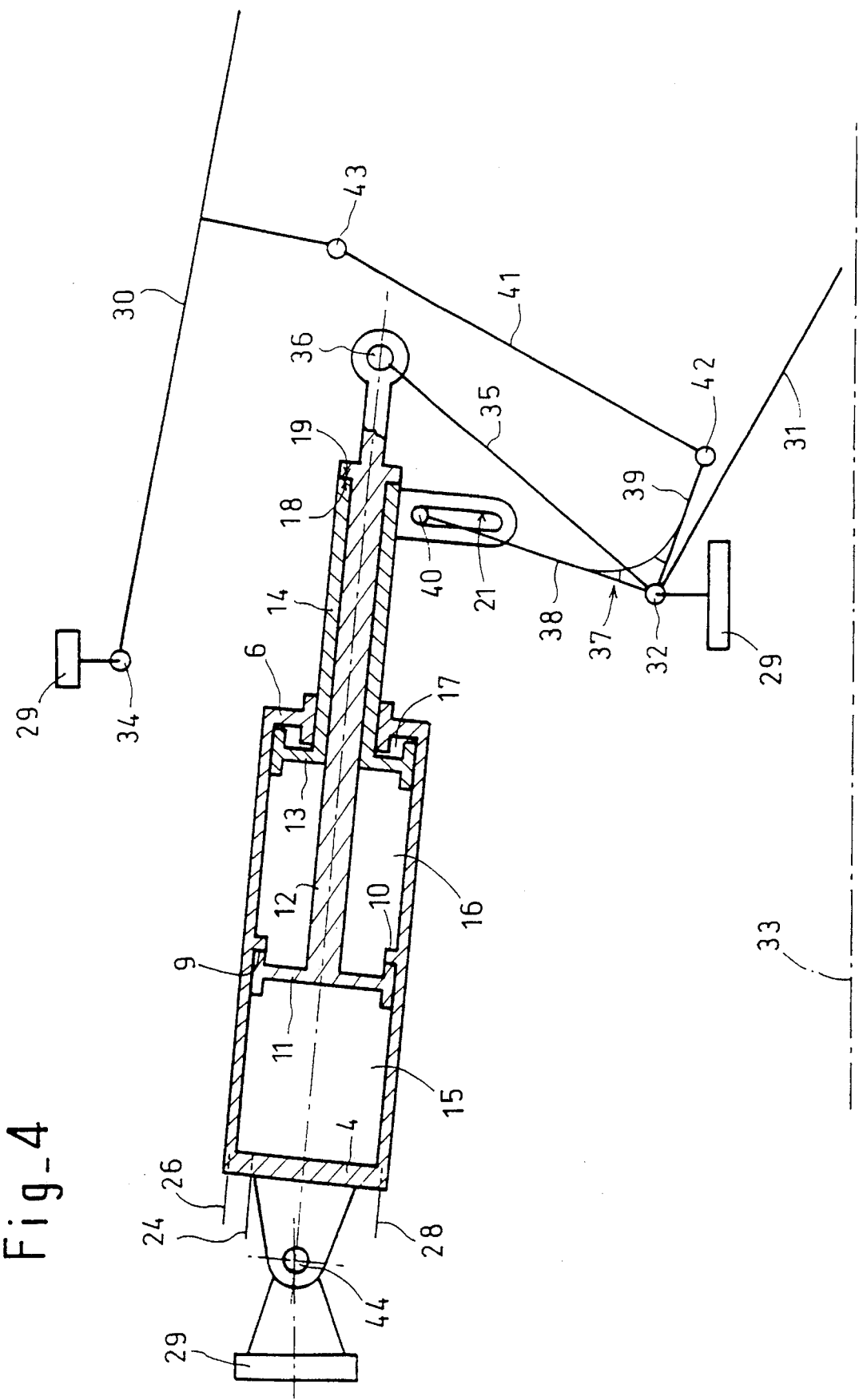
Fig_4

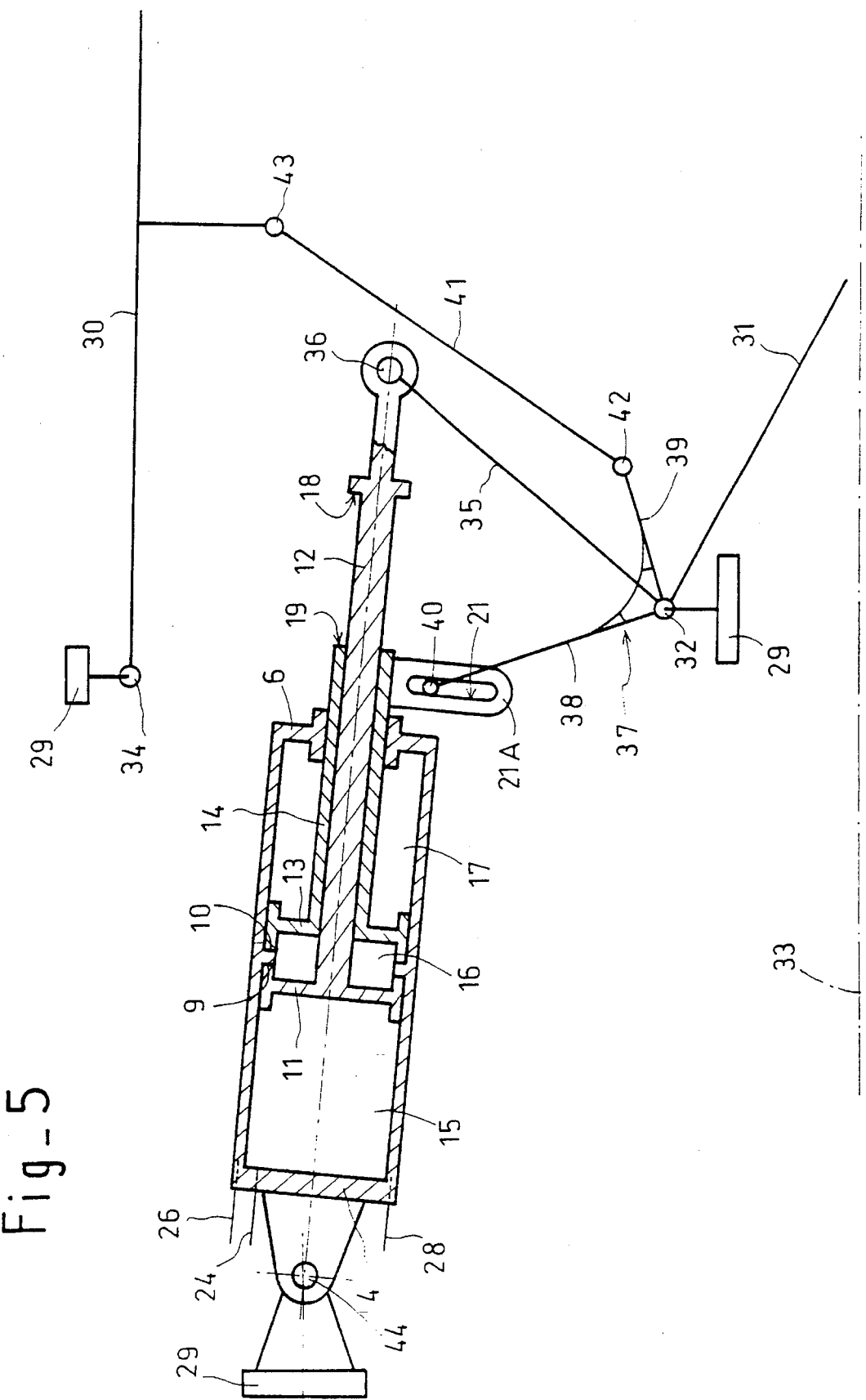

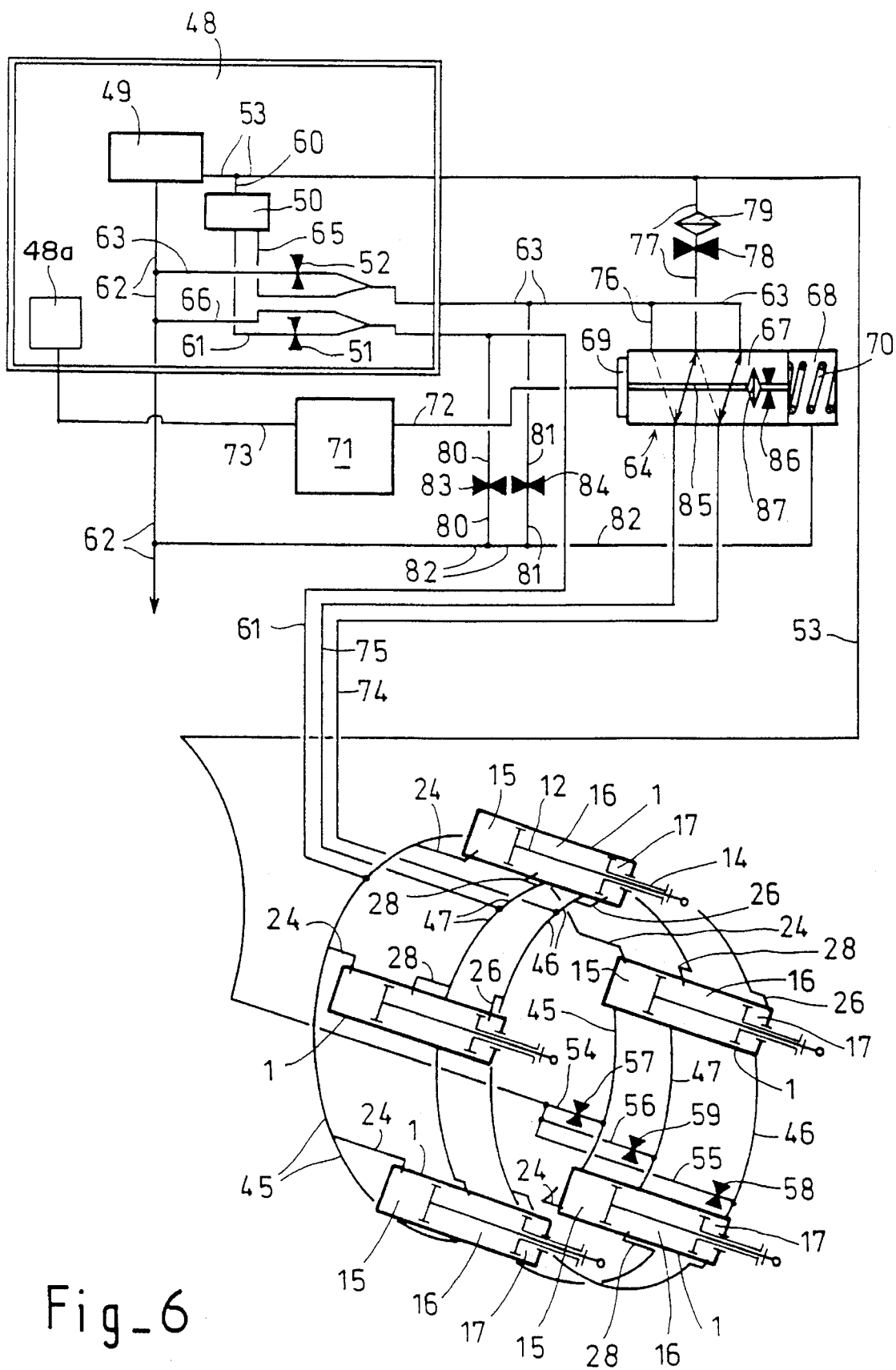
Fig_6

ACTUATING SYSTEM FOR A VARIABLE AREA EXHAUST NOZZLE

BACKGROUND OF THE INVENTION

The present invention relates to an actuating system for a variable area exhaust nozzle, particularly such a system which utilizes a single actuating cylinder to vary the positions of inner and outer nozzle flaps.

It is known to equip gas turbine engines, such as those utilized in jet powered aircraft, with exhaust nozzles having inner and outer flaps whose positions may be varied to vary the performance characteristics of the aircraft. The flaps may be actuated by one or more control cylinders to vary their positions.

British Patent 1 254 175 discloses an exhaust nozzle comprising inner flaps controlled by two distinct sets of control cylinders and outer flaps controlled by a third set of control cylinders, different from the first two sets of control cylinders. While this system operates well, it has the drawbacks of substantial cost, as well as substantial weight and bulk due to the use of three distinct sets of control cylinders.

U.S. Pat. No. 3,537,647 discloses a variable area nozzle which reduces the weight, cost and bulk over the previously discussed system by providing for control of both the inner and outer flaps by single set of control cylinders. However, this system cannot provide some of the desirable adjustments for the flaps and thereby precludes optimizing the exhaust nozzle operation, particularly when associated with a gas turbine engine used in an aircraft which may fly at supersonic speeds.

SUMMARY OF THE INVENTION

An actuating system for a variable area exhaust nozzle is disclosed having inner and outer flaps pivotally connected to an airframe whose positions may be varied by a single set of control cylinders. The control cylinders have a case in which is slidably mounted a pair of pistons, each having piston rods extending from one side, which piston rods extend through one end of the cylinder case. The piston rods may be arranged coaxially to minimize the bulk of the actuating cylinder. One of the piston rods is connected to the inner flaps, while the other of the piston rods is connected to the outer flaps. By selectively supplying pressurized fluid to one or more combinations of a first fluid chamber defined between one of the pistons and an end of the case, a second fluid chamber defined between the two pistons, and a third fluid chamber defined between the other of the pistons and the other end of the case, the two piston rods can be made to extend or retract so as to move the inner and outer flaps to desired positions.

The travel of the pistons within the case may be controlled by several stops. One of the stops limits the travel of one of the pistons between one end of the case and the stop, while a second stop limits the travel of the other piston between the opposite end of the case and the second stop. A third stop is defined between the two piston rods and is positioned such that when both piston rods are retracted, the piston rods contact the third stop. Similarly, when both piston rods are extended to their extreme positions, the piston rods engage the third stop so as to maintain the other of the pistons out of contact with the end of the case through which the piston rods pass. When the piston rod connected to the inner flaps is in its extreme outward position, thereby positioning the inner flaps in closed positions, the other piston rod may be retracted so as to position the outer flaps in open positions.

Thus, the actuating system according to this invention enables the inner and outer flaps to be both open, both closed, or allows the inner flaps to be closed while the outer flaps are opened.

The main advantage of the present invention is the possibility of implementing all desired adjustments of the inner and outer flaps of an exhaust nozzle using a single set of control cylinders. The present system enables gains regarding not only the cost of the system, but also gains with respect to weight and bulk, valuable features in aeronautical applications.

BRIEF DESCRIPTION OF THE DRAWINGS

FIG. 1 is a longitudinal, cross-sectional view of a control cylinder according to the present invention.

FIG. 2 is a side view of a jet aircraft incorporating the exhaust nozzle actuating system according to the present invention.

FIG. 3 is a schematic view, partially in cross-section, illustrating the control cylinder of FIG. 1 connected to inner and outer flaps with the flaps in their open positions.

FIG. 4 is a schematic view, similar to FIG. 3, illustrating the positions of the control cylinder elements when the inner and outer flaps are in their closed positions.

FIG. 5 is a schematic view, similar to FIGS. 3 and 4, illustrating the positions of the control cylinder elements when the inner flap is closed and the outer flap is open.

FIG. 6 is a schematic diagram of the hydraulic control circuit for the actuating system according to the present invention.

DETAILED DESCRIPTION OF THE PREFERRED EMBODIMENT

The function and operation of the control cylinder utilized in the actuating system according to this invention will be described in conjunction with its use for controlling a variable area exhaust nozzle for a jet propelled aircraft. However, it is to be understood that the control cylinder may be utilized in other applications without exceeding the scope of this invention.

The control cylinder utilized in the instant actuating system, as best illustrated in FIG. 1, comprises a cylinder case 1 having an inner side surface 2, which may be cylindrical in configuration and extend about longitudinal axis 3. The case has first and second ends 4 and 6, respectively, which have inner surfaces 5 and 7, respectively. The inner side surface 2, and the end inner surfaces 5 and 7 define an inner volume of the cylinder case.

A ring-shaped member 8, which may be formed integrally with case 1, extends into the inner volume and is located substantially equidistantly between the end inner surfaces 5 and 7. The member 8 defines opposite sides which constitute a first stop 9 and a second stop 10.

First piston 11 is slidably located within the inner volume of case 1 so as to be movable between the end inner surface 5 and the first stop 9. First piston rod 12 is rigidly attached to the first piston 11 and extends exteriorly of the case 1 through end 6 so as to be substantially coaxial with respect to the longitudinal axis 3. Second piston 13 is also slidably located within the inner volume of the case 1 so as to be movable between the end inner surface 7 and the second stop 10. Second piston rod 14 is rigidly attached to the second piston 13 and extends from one side thereof exteriorly of the case through end 6. Piston rod 14 extends coaxially with piston rod 12 along the longitudinal axis 3. As can be seen in FIG. 1, piston rod 14 partly encloses the first piston rod 12.

This arrangement defines a first fluid chamber 15 between the first piston 11 and the end inner surface 5, a second fluid chamber 16 between first piston 11 and second piston 13, and a third fluid chamber 17 between the second piston 13 and the end surface 7.

The portion of first piston rod 12 which is exterior of the case 1 defines a generally transverse, third stop 18 against which the distal end 19 of the second piston rod 14 may rest so as to limit the travel between the first and second piston rods. The first piston rod 12 defines an eye 20 for attachment to the variable area nozzle flaps while second piston rod 14 has bracket 21A fixedly attached thereto and defining an elongated slot 21 for connection with the variable area nozzle system. A bracket is attached to end 4 of the case 1, which bracket defines opening 22 to enable the case 1 to be attached to an airframe, as will be hereinafter described in more detail.

Each of the three fluid chambers 15, 16 and 17 is connected to a pressurized fluid supply circuit. End 4 defines passageway 23 which is operatively connected to fluid conduit 24 in order to supply or exhaust pressurized fluid to or from first fluid chamber 15. Case 1 defines fluid passageway 25 which communicates with the third fluid chamber 17 near the end 6 and which is operatively connected to fluid conduit 26 so as to supply pressurized fluid to, or exhaust fluid from third fluid chamber 17. Casing 1 also defines passageway 27 which communicates with the second fluid chamber 16 and which is connected to fluid conduit 28 so that pressurized fluid may be supplied to, or exhausted from second fluid chamber 16.

The dimensions of the various components of the control cylinder, and particularly the locations of stops 9 and 10 within the case 1 relative to each other, the lengths of the piston rods 12 and 14, the location of the third stop 18 on the first piston rod 12, and the distance of movement of the first and second pistons 11 and 13 between their respective end surfaces and the first and second stops 9 and 10 are selected such that the inner and outer flaps to which the control cylinder is connected may be moved independently. The inner and outer flaps may be both opened, both closed, or the inner flap may be closed and the outer flap opened as illustrated in FIGS. 3, 4 and 5, respectively. In FIG. 3, it can be seen that outer flap 30 (which may be designated a cold flap) and inner flap 31 (which may be designated a hot flap) are both in their first or opened positions. In these flaps positions, the first piston 11 is in contact with the first end inner surface 5 there/by retracting the first piston rod 12 to its innermost position within the case 1. In this position, the distal end 19 of the second piston rod 14 bears against stop 18. As can also be seen, when the end of piston rod 14 is in contact with stop 18, the piston 13 is in contact with the stop 10.

When it is desired to move both the inner flap 31 and the outer flap 30 to second, or closed positions, as illustrated in FIG. 4, the first piston 11 is moved until it bears against stop 9, while second piston 13 is moved until the distal end 19 of piston rod 14 is in contact with stop 18. Again, it should be noted, in these positions, piston 13 is not in contact with the end inner surface 7 of the casing end 6.

Under certain aircraft operating conditions, it is necessary to close the inner flap 31 while opening the outer flap 30. In order to accomplish this, as illustrated in FIG. 5, the first piston 11 is moved until it contacts stop 9, while second piston 13 is moved toward first piston 11 until it contacts stop 10. As can be seen, when in these positions, the volume of second fluid chamber 16 is at a minimum and is less than the volumes of first fluid chamber 15 or third fluid chamber 17 each of which are at a maximum. Also, bracket 21A is out of contact with the end 6 of casing 1.

FIG. 2 schematically illustrates a side view of a supersonic aircraft having an airframe 29 to which the variable area exhaust nozzle 30 is attached. Although the previously discussed FIGS. 3–5 schematically illustrate two adjustable flaps 30 and 31, it should be understood that, in known fashion, a plurality of such flaps may be oriented in generally annular arrays so as to define the exhaust nozzle. Both the inner flaps 31 and the outer flaps 30 are pivotally attached to the airframe 29 so as to pivot about pivot axes 32 and 34, respectively, both axes extending generally transverse and perpendicular to the longitudinal axis 33 of exhaust nozzle 30. A link member 35 is fixedly attached to the flap 31 and is pivotally connected at 36 to the eye 20 of first piston rod 12. As can be seen in FIGS. 3–5, extension and retraction of the first piston rod 12 causes inner flap 31 to pivot about its pivot axis 32.

The outer flap 30 is connected to the second piston rod 14 via a bellcrank 37 which is pivotally attached to the airframe 29 and has a first arm 38 pivotally attached to bracket 21A via connection 40, which slidably engages the elongated slot 21. A second bellcrank arm 39 is connected to the outer flap 30 by link rod 41 which has opposite ends pivotally connected to the bellcrank 39 at pivot connection 42 and to the outer flap 30 at pivot connection 43. Bellcrank 37 may be attached to the airframe 29 so as to pivot about pivot axis 32. The case 1 may also be attached to the airframe 29 by a pivot connection 44 which extends through the eye 22.

A fluid supply circuit for the actuating system according to this invention is schematically illustrated in FIG. 6. As can be seen, the fluid conduits 24 from the set of control cylinders utilized to actuate the flaps of the nozzle are connected to a common fluid conduit 45. Similarly, fluid conduits 26 are connected to a common fluid conduit 46 and fluid conduits 28 are connected to a common fluid conduit 47.

The hydraulic exhaust nozzle control unit 48 comprises a source of high pressure 48a, a pump 49, a servo valve 50 and constrictions 51 and 52 which generate pressure drops. The pressure conduit 53 of pump 49 is connected to the fluid conduits 45, 46 and 47 by means of conduits 54, 55 and 56, respectively, which contain constrictions 57, 58 and 59. A conduit 60 connects the conduit 53 to the servo valve 50, while conduit 61 connects the servo valve 50 to the conduit 45. Constriction 51 is located in conduit 61. A main low pressure return conduit 62 is connected to the pump 49 so as to return pump excess to the main fluid reservoir (not shown). Conduit 63 connects fluid valve 64 to the conduit 62, which includes constriction 52. Conduit 65 connects the servo valve to a portion of the conduit 63 which is located between the valve 64 and the constriction 52. Conduit 66 connects a portion of conduit 61 located between the constriction 51 and the conduit 45 to conduit 62.

The fluid valve 64 comprises a sliding element 67, and chambers 68 and 69 located on either side of the slide member 67, chamber 68 containing a return spring 70, while chamber 69 is connected by conduit 72 to an electrovalve 71 which is connected to the high pressure source 48a by conduit 73. Conduits 74 and 75 connect the fluid valve 64 to the conduits 46 and 47, respectively, and can selectively communicate through the valve 64 with the conduit 63 and conduit 76 connected to the conduit 63, or to conduit 77 bypassing conduit 53 and seating a diaphragm 78 protected by a filter 79.

Fluid return conduits 80, 81 and 82 connect the conduits 61, 63 and the chamber 68 to the return conduit 62. Constrictions 83 and 84 are located in conduits 80 and 81, as illustrated. Conduit 85 in the valve slide member 67 connects chambers 68 and 69 and contains a constriction 86 and a filter 87.

By controlling the various components, the following pressures can be achieved:

HPen=high-pressure, exhaust nozzle (conduit 53)
CPen=closed-pressure, exhaust nozzle (conduit 61)
OPen=open-pressure, exhaust nozzle (conduit 63)
HPhu=high-pressure, hydraulic unit (conduit 73)
LP=low-pressure (conduit 62).

In order to achieve the configuration illustrated in FIG. 3, the fluid chambers 15 are supplied in the CPen mode, the fluid chambers 16 supplied in HPen and the chambers 17 supplied in OPen. The results of these pressures acting on the cross-sections of the pistons 11 and 13 urge them into the configuration shown in FIG. 3, which is the low power operating mode of the jet engine, or at full power minimum thrust, both modes with minimum control pressures.

The configuration of FIG. 4 is achieved by the same connections, however, with the gas turbine jet engine operating at full power in the subsonic mode with maximum thrust. The control pressures are also at a maximum.

The configuration of FIG. 5 is that for the jet engine operating at cold power in the supersonic mode with maximum thrust. The control pressures are, therefore, a maximum. The fluid chambers 15, 16 and 17 are supplied with fluid in the CPen, OPen and Hpen modes, respectively. It should be noted that the pressures Cpen, Open and Hpen may vary in the course of the operation of the jet engine and make it possible to regulate the exhaust nozzle and the desired positions of the inner and outer flaps.

This nozzle system also enables the drag forces acting on the aircraft to be reduced. During supersonic flight, the outer exhaust nozzle flaps 30 (cold flaps) form an extension of the aircraft fuselage contour and, therefore, do not produce shock waves that would increase the drag forces acting on the aircraft. Using the actuating system according to this invention, these positions of the outer flaps 30 do not inhibit the mobility of the inner flaps 31 which facilitate the normal operation of the jet engine under these conditions.

An advantage of the present invention is the use of a single set of control cylinders, instead of the two or more sets of cylinders of conventional actuating systems to thereby reduce the weight and complexity of the nozzle assembly.

While the present invention has been described in relation to a converging exhaust nozzle, it should be understood that it is equally applicable to a convergent-divergent exhaust nozzle.

The foregoing description is provided for illustrative purposes only and should not be construed as in any way limiting this invention, the scope of which being defined solely by the appended claims.

We claim:

1. A pressurized fluid cylinder comprising:
   a) a case having first and second ends, and defining an inner volume bounded by an inner side surface, a first end surface and a second end surface;
   b) first and second stops extending into the inner volume between the first and second end surfaces;
   c) a first piston slidably located within the inner volume so as to move between the first end surface and the first stop, the first piston having a first piston rod extending from one side thereof such that the first piston rod extends exteriorly of the case through the second end;
   d) a second piston slidably located within the inner volume so as to move between the second stop and the second end surface, the second piston having a second piston extending from one side thereof with a distal end, such that the second piston rod extends exteriorly of the case through the second end coaxially with the first piston rod;
   e) third stop means defined by the first piston rod adapted to contact the distal end of the second piston rod;
   f) a first fluid chamber defined between the first piston and the first end surface;
   g) a second fluid chamber defined between the first and second pistons; and,
   h) a third fluid chamber defined between the second piston and the second end surface; whereby the pistons are movable such that the cylinder has: a first configuration wherein the first piston contacts the first end surface, the distal end of the second piston rod contacts the third stop and the second piston contacts the second stop; a second configuration wherein the first piston contacts the first stop, the distal end of the second piston rod contacts the third stop and the second piston is displaced from the second end surface; and a third configuration wherein the first piston contacts the first stop and the second piston contacts the second stop.

2. The pressurized fluid cylinder of claim 1 wherein the first and second stops are located such that, when the cylinder is in the third configuration, the volume of the second fluid chamber is at its minimum and is smaller than the volumes of the first and third fluid chambers.

3. The pressurized fluid chamber of claim 1 further comprising a member projecting into the inner volume of the case having opposite sides which define the first and second stops, respectively.

4. The pressurized fluid chamber of claim 1 further comprising:
   a) a first passageway defined by the case in fluid communication with the first fluid chamber;
   b) a second passageway defined by the case in fluid communication with the second fluid chamber; and,
   c) a third passageway defined by the case in fluid communication with the third fluid chamber.

5. A variable area nozzle for a jet propelled aircraft having an airframe with a jet exhaust having a longitudinal axis, the variable area nozzle comprising:
   a) at least one first nozzle flap pivotally attached to the airframe adjacent to the jet exhaust so as to pivot about a first pivot axis extending generally perpendicular to the longitudinal axis between first and second positions;
   b) at least one second nozzle flap pivotally attached to the airframe adjacent to the jet exhaust so as to pivot about a second pivot axis extending generally perpendicular to the longitudinal axis between first and second positions;
   c) at least one pressurized fluid control cylinder comprising:
      i) a case having first and second ends, and defining an inner volume bounded by an inner side surface, a first end surface and a second end surface;

ii) first and second stops extending into the inner volume between the first and second end surfaces;

iii) a first piston slidably located within the inner volume so as to move between the first end surface and the first stop, the first piston having a first piston rod extending from one side thereof such that the first piston rod extends exteriorly of the case through the second end;

iv) a second piston slidably located within the inner volume so as to move between the second stop and the second end surface, the second piston having a second piston extending from one side thereof with a distal end, such that the second piston rod extends exteriorly of the case through the second end coaxially with the first piston rod;

v) third stop means defined by the first piston rod adapted to contact the distal end of the second piston rod;

vi) a first fluid chamber defined between the first piston and the first end surface;

vii) a second fluid chamber defined between the first and second pistons; and, viii) a third fluid chamber defined between the second piston and the second end surface; whereby the pistons are movable such that the cylinder has: a first configuration wherein the first piston contacts the first end surface, the distal end of the second piston rod contacts the third stop and the second piston contacts the second stop; a second configuration wherein the first piston contacts the first stop, the distal end of the second piston rod contacts the third stop and the second piston is displaced from the second end surface; and a third configuration wherein the first piston contacts the first stop and the second piston contacts the second stop;

d) first connecting means connecting the at least one first flap to the first piston rod such that, in the first cylinder configuration wherein the first piston contacts the first end surface, the distal end of the second piston rod contacts the third stop and the second piston contacts the second stop the at least one first flap is in its first position; in the second cylinder configuration wherein the first piston contacts the first stop, the distal end of the second piston rod contacts the third stop and the second piston displaced from the second end surface and third cylinder configuration wherein the first piston contacts the first stop and the second piston contacts the second stop the at least one first flap is in its second position; and, e) second connecting means connecting the at least one second flap to the second piston rod such that, in the first cylinder configuration wherein the first piston contacts the first end surface the distal end of the second piston rod contacts the third stop and the second piston contacts the second stop and third cylinder configuration wherein the first piston contacts the first stop and the second piston contacts the second stop the at least one second flap is in its first position and in the second cylinder configuration wherein the first piston contacts the first stop the distal end of the second piston rod contacts the third stop and the second piston displaced from the second end surface the at least one second flap is in its second position.

6. The variable area nozzle of claim 5 wherein the first connecting means comprises a link member fixedly attached to the at least one first flap and pivotally connected to the first piston rod.

7. The variable area nozzle of claim 5 wherein the second connecting means comprises:

a) a bellcrank pivotally attached to the airframe, and having a first arm pivotally attached to the second piston rod and a second arm; and, b) a link rod pivotally connected to the second arm of the bellcrank and pivotally connected to the at least one second flap.

8. The variable area nozzle of claim 7 wherein the bellcrank is located so as to pivot about the first pivot axis.

9. The variable area nozzle of claim 7 further comprising a bracket member fixedly attached to the second piston rod and defining an elongated slot in which the first arm of the bellcrank is pivotally engaged.

10. The variable area nozzle of claim 5 further comprising attaching means to pivotally attach the first end of the cylinder case to the airframe.

* * * * *